United States Patent [19]
Hui

[11] Patent Number: 4,761,778
[45] Date of Patent: Aug. 2, 1988

[54] CODER-PACKETIZER FOR RANDOM ACCESSING IN DIGITAL COMMUNICATION WITH MULTIPLE ACCESSING

[75] Inventor: Joseph Y. N. Hui, Plainfield, N.J.

[73] Assignee: Massachusetts Institute of Technology, Cambridge, Mass.

[21] Appl. No.: 722,275

[22] Filed: Apr. 11, 1985

[51] Int. Cl.$^4$ .................. H04L 5/22; H04Q 11/04; H04J 3/00

[52] U.S. Cl. .................... 370/46; 370/60; 370/109; 371/45

[58] Field of Search .............. 370/85, 94, 60, 99, 370/89, 109, 104, 46; 371/45, 46

[56] References Cited

U.S. PATENT DOCUMENTS

| | | | |
|---|---|---|---|
| 3,988,677 | 10/1976 | Fletcher et al. | 371/45 |
| 4,063,038 | 12/1977 | Kaul et al. | 370/84 |
| 4,312,070 | 1/1982 | Coombes et al. | 371/45 |
| 4,354,057 | 10/1982 | Atal | 179/1 SA |
| 4,567,591 | 1/1986 | Gray et al. | 370/109 |
| 4,641,304 | 2/1987 | Raychaudhuri | 370/95 |

FOREIGN PATENT DOCUMENTS

PCT/US83/-
01338 9/1983 PCT Int'l Appl.

OTHER PUBLICATIONS

"Frequency Division and Time Division Multiplexing", *Computer Networks*, Andrew Tanenbaum, Prentice Hall, 1981.

"The Network Layer II: Satellite and Packet Radio Networks", *Computer Networks*, Andrew Tanenbaum, Prentice Hall, 1981.

"Tree Algorithms for Packet Broadcast Channels", *IEEE Transactions on Information Theory*, vol. IT-25, No. 5, Sep., 1979 John I. Capetanakis.

"A Class of Efficient Contention Resolution Algorithms for Multiple Access Channels", *IEEE Transactions on Communications* vol. COM-33; No. 2, Feb. 1985, Jeannine Mosely and Pierre A. Humblet.

"Multiple Accessing for the Collision Channel Without Feedback", *IEEE Journal on Selected Areas in Communications*, vol. SAC-2, No. 4 Jul. 1984, Joseph Y. N. Hui.

"A New Coding Technique for Asynchronous Multiple Access Communication", *IEEE Transactions on Communication Technology* vol. COM-19, No. 5, Oct. 1971, Cohen, Heller and Viterbi.

"Spread Spectrum Mobile Radio, 1977–1982", *IEEE Transactions on Vehicular Technology*, vol. VT-32, No. 1, Feb. 1983, On-Ching Yue.

"Viterbi Decoding for Satellite and Space Communication", *IEEE Transactions on Communication Technology*, vol. COM-19, No. 5, Oct. 1971, Jerrold A. Heller and Irwin M. Jacobs.

*Primary Examiner*—Douglas W. Olms
*Assistant Examiner*—Frank M. Scutch, III
*Attorney, Agent, or Firm*—Hamilton, Brook, Smith & Reynolds

[57] ABSTRACT

A Coded Data Multiple Access (CDMA) communication system in which a bit stream of digitized data is convolutionally encoded, and interleaved, to provide time diversity for consecutive output bits of the encoder. The interleaved encoded message is packetized into blocks to which synchronization and user identity preambles are provided. Each packet is transmitted in time compressed bursts at random time intervals.

8 Claims, 4 Drawing Sheets

| ROW | COL.1 | COL.2 |
|---|---|---|
| a. | $T_1$ | 1 0 0 |
| b. | $T_2$ | 1 1 0 |
| c. | $T_3$ | 0 1 1 |
| d. | $T_4$ | 1 0 1 |
| e. | $T_5$ | 1 1 0 |
| f. | $T_6$ | 0 1 1 |

*Fig. 2*

| | | |
|---|---|---|
| a. | 0 1 | SR1 |
| b. | 0 1 | SR2 |
| c. | 0 0 | SR3 |
| d. | 1 1 | SR4 |
| e. | 0 0 | SR5 |
| f. | 1 1 | SR6 |

*Fig. 3*

EMPTY

FILLED

• • •
• • •
• • •

LENGTH OF THE FIRST FEW PACKETS OF A MESSAGE

CONVOLUTIONAL INTERLEAVING

CODER-PACKETIZER FOR RANDOM ACCESSING IN DIGITAL COMMUNICATION WITH MULTIPLE ACCESSING

GOVERNMENT SUPPORT

The Government has rights in this invention pursuant to Contract No. N00014-75-C-1183, awarded by the Department of the Navy and ECS-79-19880, awarded by the National Science Foundation.

TECHNICAL FIELD

This invention relates to digital communications and, more particularly, to a method and apparatus for signalling and decoding data in a non-feedback multiple access communication channel with very low bit error rate and a relatively small level of decoding complexity. The invention is believed particularly useful for mobile radio applications wherein multiple accessing is required.

BACKGROUND ART

The need for improved methods and apparatus in digital communication has resulted from, among other things, (1) demands for data transmission of every form, from computer data banks to mobile radio communication, with ever increasing accuracy requirements and (2) the proliferation of data communication networks which must simultaneously serve many different users with a variety of rates and requirements.

Much attention has been given to the theoretical and practical solutions to multiple access communication in which communication is required over a shared channel by many users. Such systems include Time Division Multiple Accessing (TDMA) [1], Frequency Division Multiple Accessing (FDMA) [1], the Aloha system [2], the Capetanakis tree algorithm [3] (as modified by Gallager [4]) and Code Division Multiple Accessing (CDMA) [5]. The variety of systems can be attributed to the different requirements and resources of the communication system.

In the Aloha system, each user generates "packets" of data. These packets are transmitted over a communication channel as each are generated. If the transmission results in a collision with packets from other users, the user retransmits the packet after a random delay. Repeated transmission occurs until the packet is eventually successfully transmitted. This simple technique, by itself, is unstable since the channel soon becomes flooded with retransmissions. Accordingly, some form of stability control circuitry is required with the Aloha system.

Some of the proposed multiple access systems, such as the Aloha and Capetanakis tree, require feedback of information from the users to achieve transmitter synchronism. This feedback can be difficult to achieve in practice. Others, such as TDMA or FDMA require timing or frequency scheduling of transmission. For example, in the TDMA system, access to a channel is achieved by dividing time into frames. Each frame consists of M slots, one for each M user. Each M user transmits its packet in its assigned slot. Therefore, in TDMA, slot and frame synchronization is required.

Likewise, FDMA assigns frequency slots to the user. Such scheduling becomes inefficient when the number of users are large and each transmit infrequently.

A need exists, therefore, for a multiple access system, especially in mobile radio applications, in which feedback and scheduling is not required.

Code division multiple accessing (CDMA) systems have been described in which feedback and scheduling are not required. CDMA systems employ redundant coding before the message is transmitted. The users transmit without scheduling among themselves, thereby interfering with each other during transmission. The redundant coding helps the receiver to recover the transmitted information, in spite of this mutual interference.

In CDMA communication systems, it is assumed that there are a relatively large number of users and only a small fraction of users are transmitting at a given time. Such is typically the case in mobile radio communication systems.

A typical CDMA system is the so-called OR channel [6]. In the OR channel CDMA, each user signals by sending pulses and information is conveyed by the time position of the pulses. Pulses, due to other users, constitute interference. An idle user sends no pulse at all.

Spread spectrum CDMA [7] has been suggested for mobile radio communications. This scheme spreads the signal of each user over a spectral bandwidth which is substantially larger than that required for a single user. However, the throughput of this system is low and attenuation, due to distance, makes uniform reliable communication difficult to achieve for all users.

Furthermore, code-word synchronization at the receiver can be difficult to achieve in both spectrum CDMA and OR channel CDMA.

Accordingly, a need exists for a multiple access communication system without feedback, wherein it is unnecessary to assign different codes to different users, and which has relatively high throughput, and provides uniformly reliable communication among remote, as well as proximate, users and wherein synchronization of receivers is simple to achieve.

DISCLOSURE OF THE INVENTION

The invention comprises a new and useful CDMA system in which, prior to transmission, the input message from each user is redundantly encoded, preferably by a convolutional encoder, and the coded message is interleaved to provide time diversity for consecutive output bits of the encoder. Then, the interleaved coded message is packetized into blocks to which preambles are provided for synchronizing the users transmitter/receiver and for packet identification. Finally, each packet is transmitted in bursts, i.e., in a compressed time scale and at a random time to minimize collisions.

The system of the invention has the following significant advantages:

There is no need to assign different codes to different subscribers as in spread spectrum CDMA or the OR channel CDMA. Each subscriber identifies its packets by checking the identity preamble of the packets. Synchronization is achieved using the synchronization preamble of the packets. The portion of a packet erased by collision is ignored.

Any modulation technique may be used, thus standardized modems are not required. Furthermore, this modulation independence enables the system to be used in a network with different media of transmission (such as radio and optical fiber), which may require different modulation schemes.

The packetizing of information provides ease of processing in the network, such as switching, buffering, identification, regeneration, etc.; whereas, for example, spread spectrum CDMA often requires decoding of the message before processing. The present system is compatible with a packet-switched network philosophy; a promising technology for the future.

The communication channel degrades gracefully as the number of simultaneous users gets large.

BRIEF DESCRIPTION OF THE DRAWINGS

FIG. 2 is a representation of the contents of register 6 for a typical bit stream at successive time intervals, $T_1$–$T_6$.

FIG. 3 is a representation of M packets, 2 bits each, stored in registers based upon the encoding and interleaving of the bit stream shown in FIG. 2.

BEST MODE OF CARRYING OUT THE INVENTION

Figure 1:
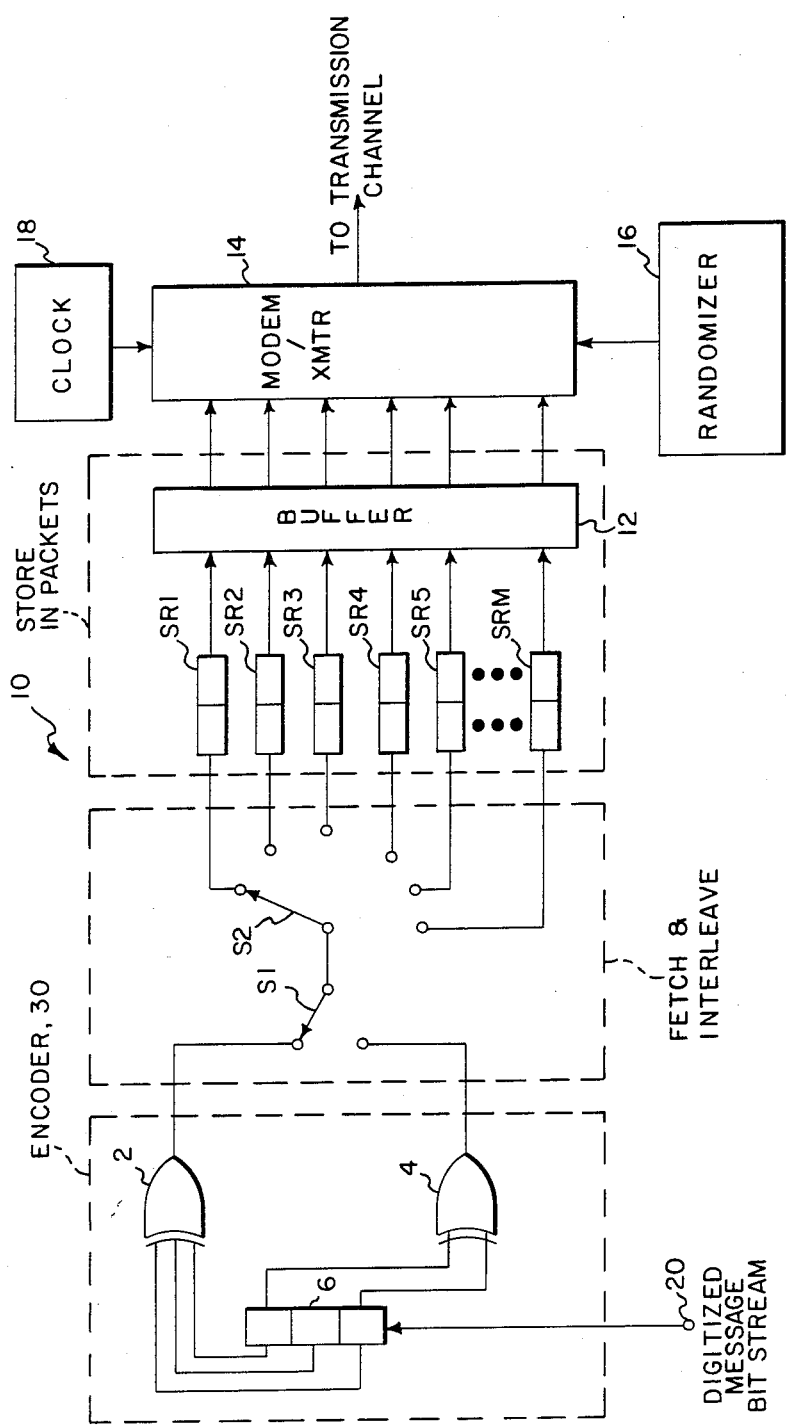
FIG. 1 is a simplified block diagram of a coder/packetizer in accordance with the invention.

Referring now to FIG. 1, a user message comprising a digitized bit stream from one user is coupled to input port 20 of encoder/interleavor circuit 10. The encoder 30 is a convolutional encoder of the type described in *Principles of Digital Communication and Coding*, A. J. Viterbi and Jim K. Omura 1979, McGraw-Hill Book Company, Ch. 4, P.227. However, a Reed-Solomon type encoding is also contemplated by this invention.

The term convolutional applies to the class of codes in which the output symbol sequence of the coder can be expressed as the convolution of the input (bit) sequence with the code generator sequences. A convolutional encoder provides output sums which are the moving weighted sum of the information sequence encoded.

In the embodiment of FIG. 1, a simplified convolutional encoder 30 is shown to comprise a 3-bit register 6 which accepts bits from the input stream at port 20 and shifts each bit, one bit at a time, from bottom to top in the register during successive time periods $T_1$–$T_n$. Register 6 has two taps from two of the three locations in register 6 going to Exclusive OR gate 4 and three going to Exclusive OR Gate 2.

Assume that the input bit stream is the sequence of bits 10011011. At time $T_1$, the contents of register 6 is as shown in Column 2, row a (FIG. 2).

The Exclusive OR gates have the logic property that a "ONE" bit is produced at the gate output when only one input is a 1 and all others are 0. Thus, at $t_1$ the outputs of gates 2 and 4 are both "ONES".

Switch S1 alternately fetches the bits from gates 2 and 4. Switch S2 puts successive bits into M successive "packets" in shift registers SR1-SRM. In this manner, the message input stream is convolutionally encoded and the encoded message is packetized and interleaved in a column of shift registers SR1-SRM.

Switches S1 and S2 may comprise, for example, transistor switches or multiplexors controlled by timing pulses from the system clock (not shown). The convolutional encoder 30 may thus be seen to have an output rate $r = 1/v$, wherein v is the number of gates (in this case 2) and a constraint length K equal to the number of bits of storage in the registers 6.

Referring to FIG. 3, the contents of shift registers SR1 and SR2 from the first bit of the bit stream received at $t_1$ will be "ONES". At $t_2$, the contents of register 6 will be as shown in FIG. 2, column 2, row b, that is—110—. The output of gate 2 will then be a 0 and the output of gate 4 will be a 1. Thus, the contents of SR3 and SR4, based upon the coding of bit 2 of the message input stream, will be as shown in FIG. 2 rows c and d, respectively. Similarly, bit 3, which is a 0, will appear in register 6 at $t_3$ and be coded and entered into shift registers SR5 and SRM as a 0 and 1, respectively.

Note that in the simple embodiment shown herein, M=6, so only 6 shift registers are shown. Therefore, at $t_4$, the interleaving and coding process is repeated. The contents of the register 6 at $t_4$ is shown in FIG. 2, row d. It is coded and interleaved and stored in the second stage of SR1 and SR2 as 0, 0, respectively. Similarly, the 5th and 6th bits are coded and interleaved and stored in SR3, 4, 5 and M as 0, 1, 0, 1, respectively, as shown in rows c, d, e, f, of FIG. 3. In this fashion, M packets of coded messages are formed and interleaved in SR's 1-M.

When all the packets (shift registers) are filled, the contents of the shift registers are transferred to buffer 12. The encoder 30 and packetizer 40 continues to fill the now emptied stack of packets. Meanwhile, the modem/transmitter 14 fetches and transmits packets in bursts sequentially from top to bottom at a random time dictated by transmit time randomizer 16 and clock 18. Randomizer 16 may comprise a well-known random number generator which produces binary bit pseudo-random numbers.

Clock 18 generates a different binary coded decimal number (BCD) at fixed time intervals. For example, once every millisecond clock 16 generates BCD numbers starting from 1 and progressing to 1000 at the end of a one-second interval. Randomizer 16 generates a different pseudo-random BCD number at the same repetition rate, i.e., every millisecond, as clock 18 during each one-second interval. A comparison is made between the pseudo-random BCD number and the clock generated BCD number. When the two numbers coincide, a packet is transmitted by XMTR 14.

Clock 18 continues to cycle through the numbers 1–1000 while randomizer 16 cycles to new pseudo-random numbers during each successive 1-second time interval. At the instant the output of the randomizer 16 is equal to the output of clock 18, the modem 14 starts to send the synchronization preamble, followed by the identify preamble, followed by the buffered packet to be sent.

Figure 4:
FIG. 4 is an illustration of a method of filling stacks of packets.
Figure 4:
Figure 4:
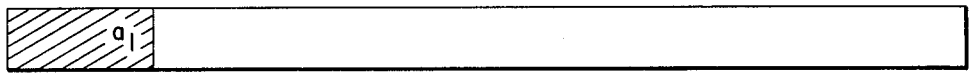
Figure 4:
Figure 4:
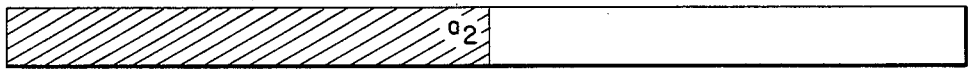
Figure 4:
Figure 4:
Figure 5:
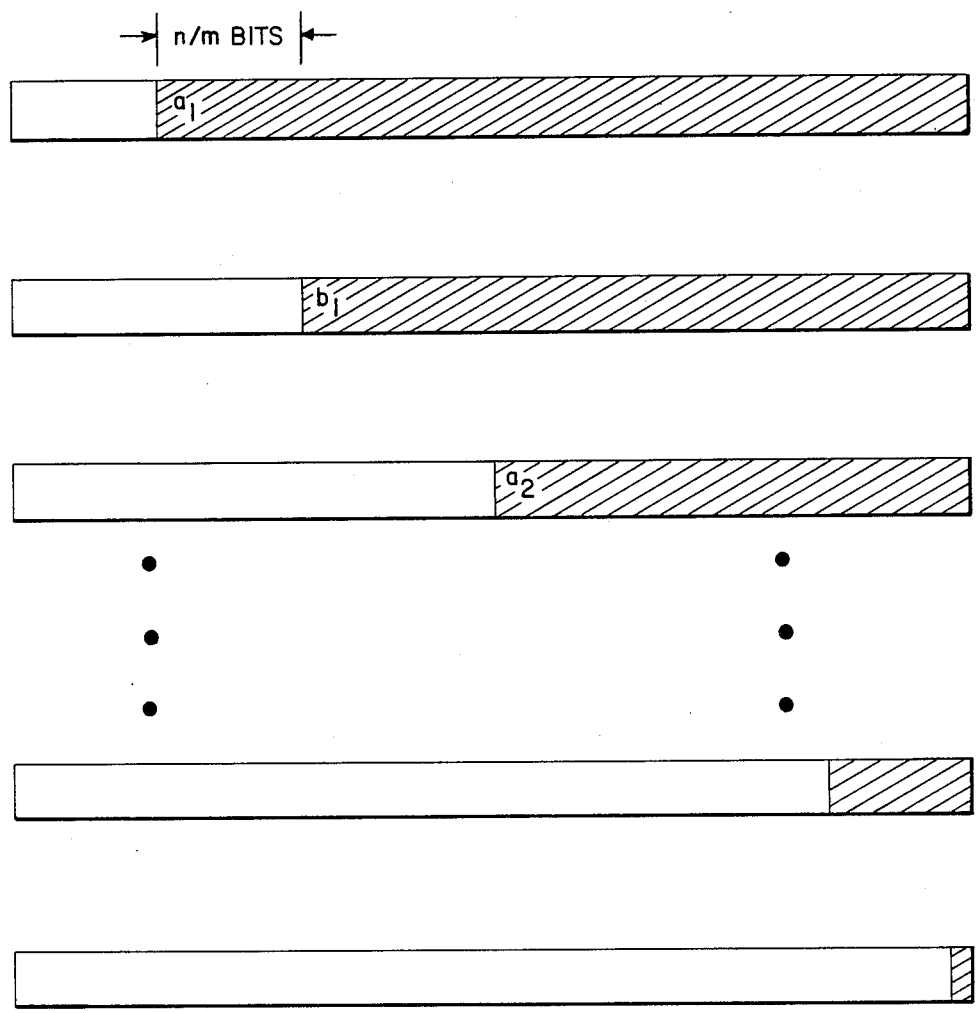
FIG. 5 is an alternate arrangement for filling stacks.

All but one of the packets on a stack may not require a buffer by filling each packet with n/m more bits than the next packet in the stack, (as shown in FIG. 4) wherein n=# bits in a packet and M=# packets in a stack. The packet at the top of the stack passes to the modem 14 when the packet is filled. An empty packet is added to the bottom of the stack when the packet at the top is passed. The passed packet is transmitted at a random time using the technique described above. This alternative, in addition to eliminating all but one packet buffer, cuts delay by half. This alternative interleaving and decoding system, however, has a problem with the first few packets of a message, since the packet at the top of the stack is empty at the beginning. Thus the first few packets would have to be filled in the manner shown in FIG. 5, subsequently wasting m/2 packets per message. This waste is tolerable only if the message is long. The choice between these two systems depends on the length of the message and the amount of decoding delay that can be tolerated.

A key to the usefulness of the system described above is that by coding and interleaving, consecutive bits of a packet are no longer serially related, in the sense that they are generated by different information bits. Instead, the relation between bits is in vertical or interleaved packets.

It is important, therefore, that the number of packets in a vertical stack be sufficiently long so that each bit in a packet is generated from a different set of information bits.

This conditions is satisfied if the number of packets is at least equal to k times v, wherein k is the number of bits in the shift register 6 of encoder 30 and v is the rate of the convolutional encoder in bits out versus bits in.

Decoding may be accomplished in accordance with the principles of Viterbi Decoding [8].

Equivalents

This completes the description of the preferred embodiments of the invention. However, those skilled in the art will recognize many equivalents thereto, and such equivalents are intended to be covered by the following claims.

References (1) "Frequency Division and Time Division Multiplexing", *Computer Networks*, Andrew Tanenbaum, Prentice Hall 1981

(2) "The Network Layer II: Satellite and Packet Radio Networks", *Computer Networks*, Andrew Tanenbaum, Prentice Hall 1981

(3) "Tree Algorithms for Packet Broadcast Channels", *IEEE Transactions on Information Theory*, Vol. IT-25, No. 5, September 1979, John I. Capetanakis (4) "A Class of Efficient Contention Resolution Algorithms for Multiple Access Channels", *IEEE Transactions on Communications*, Vol. COM-33, No. 2, February 1985, Mosely et al.

(5) "Multiple Accessing for the Collision Channel Without Feedback", *IEEE Journal on Selected Areas in Communications*, Vol. SAC-2, No. 4, July 1984, Joseph Y. N. Hui (6) "A New Coding Technique for Asynchronous Multiple Access Communication", *IEEE Transactions on Communication Technology*, Vol. COM-19, No. 5, October 1971, Cohen et al.

(7) "Spread Spectrum Mobile Radio, 1977–1982", *IEEE Transactions on Vehicular Technology*, Vol. VT-32, No. 1, February 1983, On-Ching Yue (8) "Viterbi Decoding for Satellite and Space Communication", *IEEE Transactions on Communication Technology*, Vol. COM-19, No. 5, October 1971, Heller et al.

I claim:

1. In a common channel of communication, apparatus for transmitting serially related bit streams of information from multiple geographically distributed sources over said common channel of communications, comprising:
   (a) an encoder for at least one such source for redundantly encoding the bits in a bit stream originating from said one such source into a serially related encoded bit stream;
   (b) interleaving means for interleaving the bits into a plurality of different packets of bits;
   (c) storage means for storing said packets;
   (d) transmitter means for transmitting said packets in bursts at random intervals over said common channel; the number of such packets being sufficiently large so that consecutive bits in a packet are not serially related.

2. The apparatus of claim 1 wherein a randomizer means enables the transmitter means to transmit the packets at said random intervals.

3. The apparatus of claim 1 wherein the encoder is a convolutional encoder.

4. Apparatus for transmitting serially related bit streams of information from multiple geographically distributed sources over a common channel of communications, comprising for each such source:
   (a) a convolutional encoder having a code sequence for redundantly encoding the bits in a sequence of bits originating at a respective source into an output symbol sequence of serially related encoded bits which is the convolution of the bit sequence with the code generation sequence;
   (b) switching means for interleaving the encoded bits into different packets, the number of such packets being sufficiently large so that consecutive bits in each packet are not serially related;
   (c) transmitter means for transmitting said packets sequentially in a compressed time frame and at random intervals over said common channel.

5. A coded data multiple access transmitter system for transmitting bit streams of information from multiple sources geographically separated over a common channel of communications, comprising:
   (a) a convolutional encoder for redundantly encoding the bits in a bit stream originating from at least one such source to provide an encoded bit stream of consecutive serially related bits which is the moving weighted sum of the input bit stream;
   (b) interleaving means for interleaving the encoded bit stream into stacks of packets of predetermined bit length; the number of such packets being sufficient to assure that consecutive bits in each packet are not serially related;
   (c) preamble means for providing user identity and preamble bits onto said packets; and
   (d) transmitter means for transmitting said packets sequentially in a relatively short time period and at random intervals over said common channel.

6. The system of claim 5 wherein the number of packets is at least equal to k times v wherein k=the number of bits in a register and v is the rate of the convolutional encoder in bits out per bits in.

7. A method of transmitting a digitized serially related bit stream of information from multiple sources located at geographically distributed locations over a common channel of communication comprising the steps of:
   (a) redundantly encoding said information from at least one of said multiple sources into a stream of serially related encoded bits;
   (b) interleaving and storing said encoded bits into a plurality of packets, each a plurality of bits in length; the number of such packets being sufficiently large to prevent the occurrence in said packets of consecutive serially related bits;

(c) transmitting over said common channel said packets sequentially at intervals in a compressed time frame and at random intervals.

8. A method of of CDMA communication by transmitting digitized serially related bit streams of information from multiple geographically distributed sources over a common channel of communication comprising for each of said multiple sources the steps of:
(a) convolutionally encoding sets of information bits from a respective source to produce encoded sets of information bits;
(b) interleaving and storing said encoded information in a plurality of packets, each a plurality of bits in length; and the number of packets is sufficiently large so that each bit in a packet originated from a different set of encoded information bits;
(c) providing synchronization and user identity preambles on said packets;
(d) transmitting said packets over said common channel sequentially at random time intervals and in a compressed time frame.

* * * * *

UNITED STATES PATENT AND TRADEMARK OFFICE
CERTIFICATE OF CORRECTION

PATENT NO. : 4,761,778
DATED : Aug. 2, 1988
INVENTOR(S) : Joseph Y. N. Hui

It is certified that error appears in the above—identified patent and that said Letters Patent is hereby corrected as shown below:

Claim 5, col. 6, line 33, after "transmitting" insert ---serially related---.

Signed and Sealed this

Third Day of January, 1989

Attest:

DONALD J. QUIGG

Attesting Officer

Commissioner of Patents and Trademarks